Figure 1:
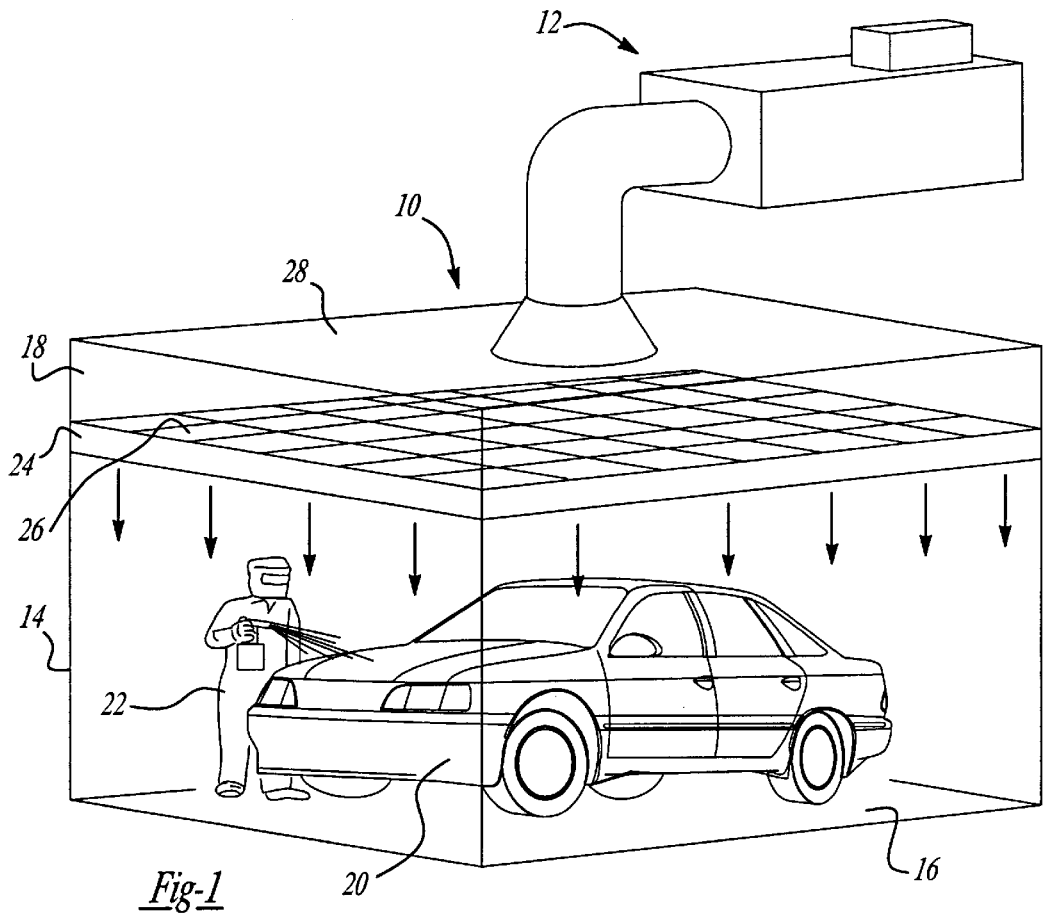

United States Patent
Schafka

[19]

[11] Patent Number: 6,129,285

[45] Date of Patent: Oct. 10, 2000

[54] SYSTEM AND METHOD FOR AIR HUMIDIFICATION

[76] Inventor: Mark Louis Schafka, 3120 Wynns Mill Pointe, Metamora, Mich. 48455

[21] Appl. No.: 09/132,280

[22] Filed: Aug. 11, 1998

[51] Int. Cl.[7] .................................. B01F 3/02; F24F 3/14
[52] U.S. Cl. ........................ 236/44 C; 62/176.6; 165/226
[58] Field of Search ................. 236/44 A, 44 R, 236/44 C; 165/224, 226; 62/176.6

[56] References Cited

U.S. PATENT DOCUMENTS

| | | | |
|---|---|---|---|
| 1,953,727 | 4/1934 | Russell et al. ................ | 165/224 X |
| 3,198,433 | 8/1965 | Crutcher ...................... | 126/113 X |
| 3,570,472 | 3/1971 | Santangelo .................... | 126/113 |
| 3,635,210 | 1/1972 | Morrow ........................ | 126/113 |
| 3,689,037 | 9/1972 | Payne .......................... | 261/105 |
| 3,770,254 | 11/1973 | Morrow ........................ | 261/105 |
| 3,774,588 | 11/1973 | Yeagle ......................... | 126/113 |
| 3,776,215 | 12/1973 | Howard et al. ................. | 126/113 |
| 3,802,161 | 4/1974 | Talbert ........................ | 261/109 |
| 3,855,371 | 12/1974 | Morrow et al. ................. | 261/100 |
| 3,900,301 | 8/1975 | Constantinescu et al. ......... | 62/314 |
| 3,923,482 | 12/1975 | Knab et al. ................... | 55/412 |
| 3,990,427 | 11/1976 | Clinebell ..................... | 126/113 |
| 4,042,016 | 8/1977 | Boochever et al. .............. | 126/113 |
| 4,078,480 | 3/1978 | Luck ........................... | 99/646 S |
| 4,272,014 | 6/1981 | Halfpenny et al. .............. | 236/44 B |
| 4,290,274 | 9/1981 | Essex .......................... | 62/157 |
| 4,365,619 | 12/1982 | Holbrook et al. ............... | 126/428 |
| 4,367,787 | 1/1983 | Bradshaw ....................... | 165/35 |
| 4,494,596 | 1/1985 | Bradshaw ....................... | 261/129 |
| 4,508,551 | 4/1985 | Ruoss et al. ................... | 55/263 |
| 4,747,980 | 5/1988 | Bakay et al. ................... | 261/129 |
| 4,879,075 | 11/1989 | Hinton ......................... | 261/26 |
| 4,906,417 | 3/1990 | Gentry ......................... | 261/30 |
| 4,913,856 | 4/1990 | Morton ......................... | 261/116 |
| 4,967,726 | 11/1990 | Finch .......................... | 126/99 R |
| 4,967,728 | 11/1990 | Dueck .......................... | 126/113 |
| 5,082,173 | 1/1992 | Poehlman et al. ................ | 165/224 X |
| 5,497,628 | 3/1996 | Stueble ........................ | 62/91 |
| 5,525,268 | 6/1996 | Reens .......................... | 239/61 X |
| 5,620,503 | 4/1997 | Miller et al. .................. | 95/211 |
| 5,699,983 | 12/1997 | Ellsworth ...................... | 4564/157 X |
| 5,740,790 | 4/1998 | Lipsky ......................... | 126/113 |
| 5,762,661 | 6/1998 | Kleinberger et al. ............. | 55/227 |

*Primary Examiner*—William Wayner
*Attorney, Agent, or Firm*—Harness, Dickey & Pierce, P.L.C.

[57] ABSTRACT

An air conditioning system and method for conditioning air utilizes a main air conditioning body fitted minimally with an ambient air temperature and humidity sensor, a humidifier, a conditioned air fan, a downstream air temperature and humidity sensor, and a central controller for sensing and controlling each of the operative elements of the system. The humidifier includes a plurality of nozzles which spray conditioning water into the incoming airstream. Optional components include an air pre-heater, a pre-filter, a heat exchanger, and a final filter.

20 Claims, 3 Drawing Sheets

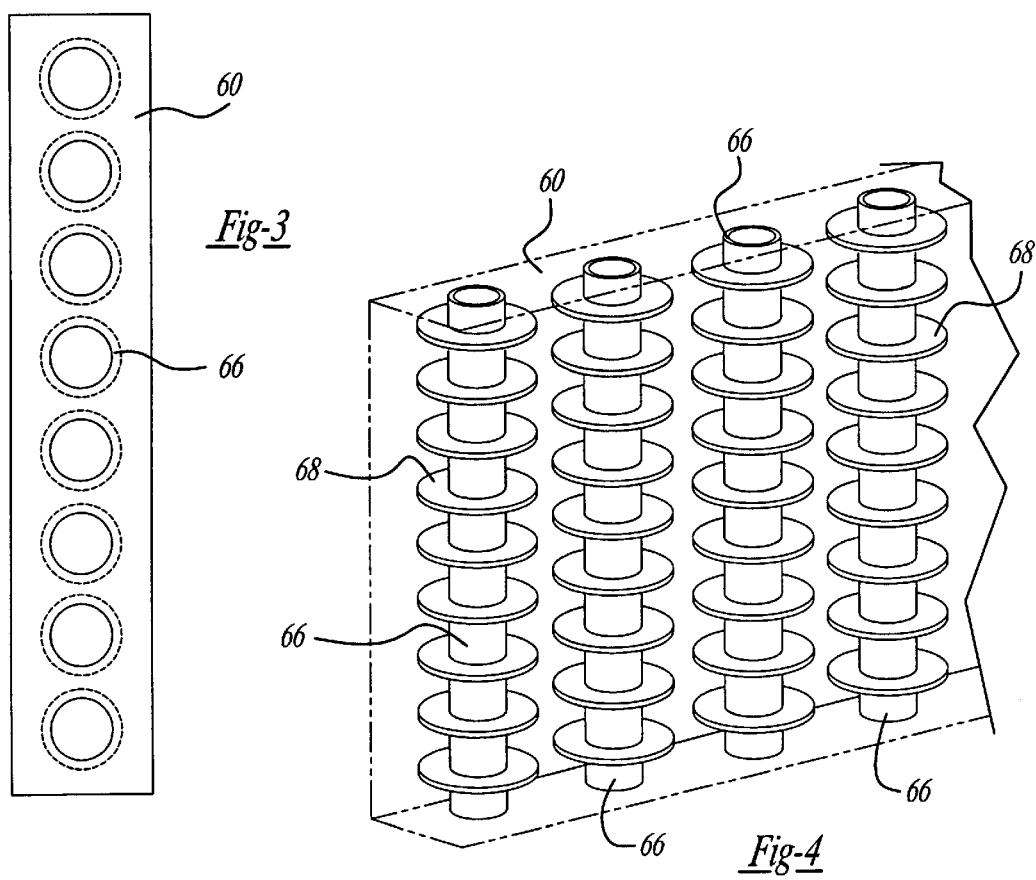
Fig-3
Fig-4
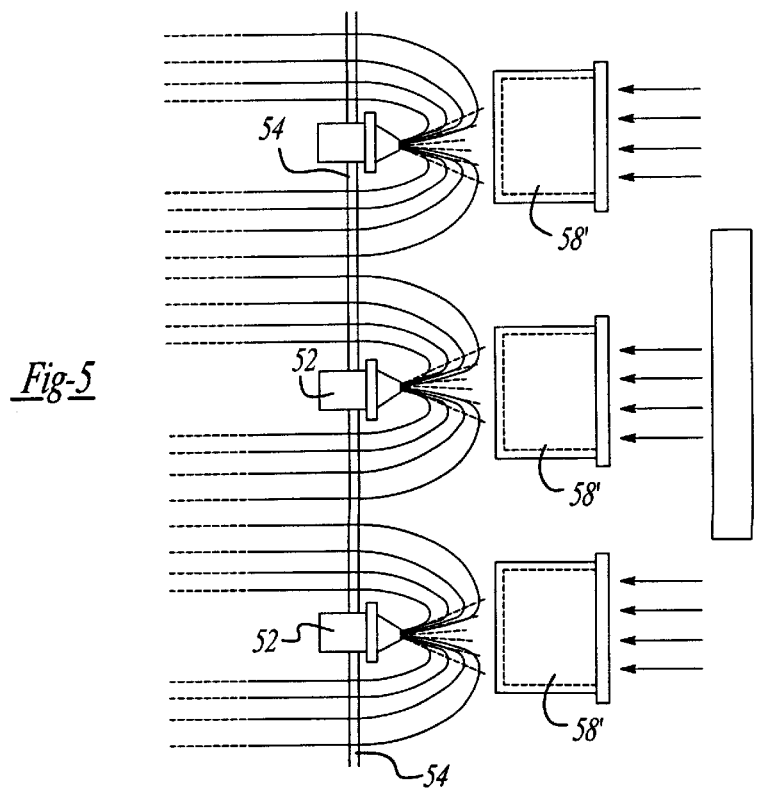
Fig-5

SYSTEM AND METHOD FOR AIR HUMIDIFICATION

TECHNICAL FIELD

The present invention relates to a system and method for air conditioning. More particularly, the present invention relates to a system and method for conditioning air supplied to humidity- and heat-sensitive environments such as paint spray booths.

DISCUSSION

Both industry and the private sector occasionally demand an environment demonstrating narrow temperatures and humidity ranges. For example, both chemical and pharmaceutical technologies frequently require very specific environmental conditions in terms of temperature and humidity.

Perhaps the largest area requiring exacting environmental specifications is spray painting technology. The automotive industry may be the most demanding of industries using paint spray booths. Air-dried paints such as lacquers and air-drying alkyd enamels had been used for many years extensively by automobile manufacturers in the painting of vehicles. These paints were largely abandoned by the automotive industries in favor of baked acrylic and urea finishes. The baked finishes provide desired qualities including extreme hardness, good chemical resistance, and strong color retention. For all of their desirable commercial qualities, hydrocarbon solvent-based painting operations present a host of environmental problems. In response, many automotive manufacturers are looking to adopt water-based paints for use as either the base coat or the clear coat or both. (Reference for powder paint finishing systems may be made to those systems provided by ABB Paint Finishing, Auburn Hills, Mich.). With each advancement in automotive painting has come increased limitations in both heat and humidity ranges in the air surrounding the painting operation. The early air-dried paints were fairly forgiving in terms of temperature and humidity, allowing for fairly wide ranges. With the advent of solvent-based paints the ranges narrowed. New paints, primarily water-based paints and powder-based paints, are the most demanding with respect to temperature and humidity levels. Specifically, water-based paints require an almost exact and constant dry bulb air temperature of 72° F. and powder-based paints require an almost exact and constant dry bulb air temperature of 55° F. However, human paint sprayers as a rule find this rain forest-like environment unpleasant, so the dry bulb temperature should not be allowed to rise about 72° F., and the relative humidity must be decreased to 65%.

While the paint demands constant environmental conditions, such specific conditions do not exist in the ambient environment anywhere at such a constant rate. Accordingly, the air must be conditioned and fed to the paint spray booth. This is a considerable task, necessitating the constant supply of an airflow at stable and accurately controlled humidity and temperature conditions. The driving factor is that typical automotive paint spraying booths require over 100,000 cubic feet per minute of airflow in order to start painting.

It may be readily understood that, given the stringent requirements of air conditioning for such massive amounts of air, the constant control of air temperature and humidity is an enormously expensive task. Today the control of both air temperature and humidity is undertaken using independent systems that are added to the airstream until the desired conditions are met. Given the criticality of the quality and durability of the paint to the sales potential of an automobile, little regard is given to cost, efficiency, energy consumption, or accuracy of the conditioning system.

Known systems for providing conditioned air also fail to provide desired constant temperature and humidity levels because of inherent structural flaws. For example, in some systems a mat or sheet of porous or semi-porous material is provided onto which flowing water is poured and through which air passes. The flowing water moves down the mat or sheet driven by gravity. These systems rely upon a solenoid to turn on or off the flow of water. This creates a staged—but not proportional—flow of water, resulting in the bumping up and down of humidity levels in the air being conditioned without any fine control thereover. Designers try to compensate for this problem by providing heaters to heat the air in an effort to evaporate the excess water. The result, however, is a non-constant level of humidity because the heater cannot react quickly enough to smoothly and evenly compensate for the staging of the water flow due to constraints caused by the physics of evaporation.

Efforts have been made in the past to deal with the problem of conditioning air present in the automotive paint spray booth. For example, U.S. Pat. No. 4,367,787, issued Jan. 11, 1983 to Bradshaw for "Air Conditioning Apparatus and Method for Paint Spray Booths" discloses a system for conditioning air used in spray booths through the adjustment of air temperature and humidity. The system includes a multi-section sprayed surface heat exchanger combined with a bypass passage. U.S. Pat. No. 5,620,503, issued on Apr. 15, 1997 to Miller et al. for "Humidifier and Method for Humidifying Air" discloses a humidifier system for use in humidifying paint booths. The system includes a housing having an upstream air inlet for receiving a stream of air to be humidified and a downstream outlet for expelling the stream of air after it has been humidified.

While improvements in systems and methods for providing temperature and humidity regulated air have been made, considerable room still exists in the technology to provide such a system which can achieve the desired results more efficiently.

SUMMARY OF THE INVENTION

The present invention provides a high-efficiency air conditioning system and method which provides resolutions to the problems attendant to known heating and humidification control systems.

Accordingly, it is an object of the present invention to provide a system and method for the efficient conditioning of air which collectively utilizes the three processes of preheating, evaporation, and heat exchanging to reduce costs related to equipment and energy consumption.

An additional object of the present invention is to provide a collective set of controls which carefully monitor and control the preheating, evaporation, and heat exchanging systems to maintain efficient energy consumption while providing stable and accurate levels of humidity and temperature.

A further object of the present invention is to provide such a system and method which delivers a more stable and accurate control of humidity and temperature.

Still a further object of the present invention is to provide such a system which utilizes a minimum amount of equipment and which occupies a minimum amount of space.

Yet another object of the present invention is to provide such a system and method which utilizes a fine cloud of atomized water sprayed against the airstream airflow to achieve maximum mixing of the air and atomized water cloud, thus providing maximum evaporation.

Still a further object of the present invention is to provide such a system and method in which predetermined dry bulb temperature levels are achieved with a minimal amount of reheating of the airflow after mechanical dehumidification.

An additional object of the present invention is to provide such a system and method which produces only a relatively small static pressure loss in the passing airstream thereby requiring only a relatively small amount of energy to push the large volume airstream through the system.

These and other objects of the present invention are achieved through the provision of a system and method for conditioning the air which utilizes a main air conditioning body fitted minimally with an ambient air temperature and humidity sensor, a humidifier, a conditioned air fan, a downstream air temperature and humidity sensor, and a central controller for sensing and controlling each of the operative elements of the system.

The humidifier includes a plurality of nozzles which spray conditioning water into the incoming airstream. This arrangement provides a number of advantages, including the efficient vaporization of water into the airstream. This efficient evaporation of the atomized spray increases the airstream humidity level to the desired point which simultaneously adiabatically cooling the air by converting the sensible heat into latent heat.

Optional elements include a burner-heater to preheat the air entering the main body, a pre-filter fitted upstream and adjacent to the humidifying nozzles, a heat exchanger fitted downstream of the nozzles, and a final filter fitted between the coils and the conditioned air fan.

Other objects and features of the present invention will become apparent as the description proceeds.

BRIEF DESCRIPTION OF THE DRAWINGS

The present invention will be more fully understood by reference to the following detailed description of the preferred embodiments of the present invention when read in conjunction with the accompanying drawings, in which like reference characters refer to like parts throughout the views, and in which:

FIG. 1 is an environmental view of a spray paint booth incorporating the system of the present invention;

FIG. 2 is a sectional view of the preferred embodiment of the system so as to the illustrate principal components;

FIG. 3 is a top plan view of the optional heat exchanger;

FIG. 4 is a perspective view of the optional heat exchanger element illustrating a plurality of individual coils;

FIG. 5 is a diagrammatic view of an array of humidifying spray nozzles positioned adjacent a like number of optional pre-filters; and FIG. 6 is a schematic of the system of the present invention to illustrate its principal and optional components in relation to the central controller.

DETAILED DESCRIPTION OF THE PREFERRED EMBODIMENTS

The drawings disclose the preferred embodiments of the present invention. While the configurations according to the illustrated embodiment are preferred, it is envisioned that alternate configurations of the present invention may be adopted without deviating from the invention as portrayed. The preferred embodiments are discussed hereafter.

FIG. 1 is an environmental view of a spray paint booth, generally illustrated as 10, having incorporated therewith an air conditioning system according to the present invention, generally illustrated as 12. The spray paint booth 10 includes a wall structure 14, a floor structure 16, and a ceiling structure 18. Of course, the wall, floor, and ceiling structures 14, 16, and 18 are only illustrative and may have a variety of appearances and sizes.

An automobile 20 is illustrated as the article being spray painted by a painter 22. However, it is to be understood that the present invention has broader application to the industry than for the painting of automobiles. For example, the spray system and method may be employed for the painting of a variety of articles, including kitchen and laundry appliances, bicycles, and furniture. Even further, the system and method of the present invention may find use as well in any environment where precise and efficient temperature and humidity control is required. Such circumstances include "clean rooms" for industrial use and rooms where chemical and biological production and examination take place. Accordingly, the illustration of FIG. 1 is to be interpreted as suggestive but not limiting.

The ceiling structure 18 is typical of known booth arrangements and includes a dropped portion 24 which is traditionally composed of a plurality of individual air diffusion panels 26. A variety of materials may be used for the diffusion panels as is known in the art. A plenum 28 is defined above the panels 26. Conditioned air is fed into the plenum 28 by the air conditioning system 12 and passes through the panels 26 which buffer the air entering the paint spray booth itself. The buffered air is corrected as to temperature and humidity. The buffering itself prevents fast moving air from disrupting the paint spray or from striking the freshly painted surface of the automobile body. The panels 26 also provide an additional measure of filtering of the incoming air.

The system 12 according to the present invention is capable of delivering the required 100 feet/minute downdraft necessary in the painting of the automobile 20 while maintaining the desired level of both temperature and humidity.

With reference to FIG. 2, a sectional view of the preferred embodiment of the system 12 is shown. The primary elements of the system 12 are a main air conditioning body 30, an ambient air temperature and humidity sensor 32, a humidifier 34, a conditioned air fan 36, a downstream air temperature and humidity sensor 38, and a central controller 40 for sensing and controlling each of the operative elements of the system 12.

The main air conditioning body 30 includes a shell 42 which may generally be defined into four sections. A first section 44 is the site for incoming air which may, optionally, be preheated as will be discussed further below. The incoming air passes through the first section 44 at a rate of between 200 FPM to 800 FPM. A second section 46 is site for humidification and includes therein the humidifier 34. A third section 48 is the site for fogging or misting as will be described in detail below. A fourth section 50 is the staging site for outbound conditioned air. The air is forced into, through, and out of the conditioning body 30 by the fan 36. Significantly, the air flow rate of between 200 FPM and 800 FPM can be maintained throughout the whole system 12. Previously known systems have not demonstrated this broad range.

As illustrated in FIG. 2, the humidifier 34 includes a plurality of humidification nozzles 52 which face into the stream of incoming air. The disposition of the nozzles 52 in this position assures more complete evaporation of the water entering the system, thus leading to better humidification of the air being conditioned. The number of nozzles 52 is dependent upon the amount of water required to bring the air to the desired level of humidity. The nozzles 52 and their arrangement with respect to the direction of air flow provide a water spray comprising water droplets in the five micron range. This small size contributes to rapid evaporation by exposing a large surface area to the passing air. In addition, by directing the water spray into the wind, the residence time of each water drop in the incoming flow of air is increased, thereby also improving more thorough evaporation of the water. Furthermore, the counterflow of water spray to air leads to increased turbulence in the airstream, this also leading to improved water evaporation.

A variety of atomizing nozzles 52 may be used as required for the particular application. For example, air-water nozzles may be used (such as Model No. SU1A supplied by Spraying Systems Co.) as might water only nozzles (such as Model No. N supplied also by Spraying Systems Co.). Of course, a mixture of the two types may be employed to fill a specific commercial application. It is generally desired to select such a nozzle that provides internal mixing, although this is not absolutely necessary.

Each of the nozzles 52 is fluidly connected to a water conduit 54 which ultimately is fed by a water supply (not shown). It is typical to use chilled water as a source for the water supply. However, the chilling of water burdens most systems with the cost of a chiller as well as additional utility expenses. As an alternative, due to the high efficiency of the system 12, water provided by local utilities may be utilized in its out-of-the-faucet form without the need and expense of an auxiliary chilling device.

The fan 36 is of the conventional high capacity variable speed type.

While the above-noted elements are requisites for the operation of the present invention, optional elements may be added as desired for a given application. Such elements include a burner-heater 56 to preheat the air entering the main body, a pre-filter 58 fitted upstream and adjacent to the humidifying nozzles 52, a heat exchanger 60 fitted downstream of the nozzles 52, and a final filter 62 fitted between the heat exchanger 60 and the conditioned air fan 36.

The burner-heater 56 provides a pre-heating of the incoming air. The heated air helps to more efficiently vaporize the water molecules therein. The burner-heater 56 is more important in cool weather climates and may, where provided, be used for several days or several weeks during the production year. In cold weather, the amount of vaporized moisture in the air is lower than in hot weather. Accordingly, the humidifier 34 must work harder to provide the requisite amount of moisture. The burner-heater 56 may be fired by either natural gas or oil as is known.

The pre-filter 58 is also optionally provided and serves a number of purposes. First, the pre-filter 58 provides an initial measure of air filtration and is directed to removing particles from the air. The mesh of the filter may configured as needed given the general environment and the painting task. Second, the pre-filter 58 provides a screen against which the water from the nozzles 52 may be sprayed in whole or in part. Such an arrangement can provide a medium upon which suspended water droplets may be held until evaporated. Such an arrangement may also be used in concert with the water spray itself, where part of the spray is applied to the pre-filter 58 and part is allowed to simply enter the air stream. The ratio of flow between the water sprayed on the pre-filter 58 and that directly entering the air stream may be selectively controlled by the controller 40. The pre-filter material may be of the various types produced by Airguard Industries, Inc., such as their panel filters (e.g., Series 55, A, and TRI-90) and their final mat diffusion media (e.g., FMM-600, FMM-300, and FMM AGR-1) and final mat panel filters (e.g., FMP-600, FMP-300, and FMP AGR-1). Alternatively, the pre-filter 58 may be a continuous filter mat supplied by a roll (not shown). The continuous filter mat may be automatically advanced to provide a new mat area as required. A sensor may be provided downstream of the pre-filter 58 to measure the pressure drop across the pre-filter 58 and to respond accordingly by advancing the roll an appropriate amount.

The heat exchanger 60 offers another advantage to the system by providing a method for more exactly controlling the temperature and humidity of the conditioned air after it has passed by the humidifier 34. By responding to the level of humidity in the air after it has passed the humidifier 34, the heat exchanger 60 may be operated to remove excess water from the humidified air as required in response to a signal produced by the sensor 38. The heat exchanger 60 finds particular application where it is necessary to bring the operating temperature in the paint spray booth to a comfortable range or below 79° F. Preferably the heat exchanger 60 is composed of copper material.

Additionally, and as a further option, hot or cold water may be provided to the heat exchanger 60 by means of a three-way valve 64. Construction details of the heat exchanger 60 are set forth below with respect to FIGS. 3 and 4.

The final filter 62 is optionally provided to remove as many of the remaining particles from the conditioned air as possible before the conditioned air exits the system 12. As with the pre-filter 58, the final filter 62 may be of the various types produced by Airguard Industries, Inc., such as their panel filters (e.g., Series 55, A, and TRI-90) and their final mat diffusion media (e.g., FMM-600, FMM-300, and FMM AGR-1) and final mat panel filters (e.g., FMP-600, FMP-300, and FMP AGR-1).

The system 12 is operated by the controller 40 which is preferably a microprocessor-based unit. The controller 40 is connected to each of the sensors 32 and 38, the fan 36, the humidifier 34, and, where provided, the burner-heater 56. Because of its computer base, the system 12—through the controller 40—may efficiently and finely respond to changes in humidity and temperature as detected by the sensors 32 and 38. Such responses include changes in the amount of heat provided by the burner-heater 56, changes in the volume of water through the nozzles 52, changes in the selection of water through certain ones of the nozzles 52 as discussed above, changes in the effective amount of condensation effected by the heat exchanger 60, and changes in the amount of air being drawn by the fan 36.

FIG. 3 is a top plan view of the optional heat exchanger 60, while FIG. 4 is a perspective view of the optional heat exchanger element 60. A plurality of individual coils 66 are provided in the heat exchanger 60. Each of the coils 66 is preferably provided with a plurality of cooling fins 68 formed thereon. The fins 68, which are preferably but not exclusively 1/16 wide, provide a more efficient form of heat exchange by collectively generating a large surface area for heat exchange.

Figure 2:
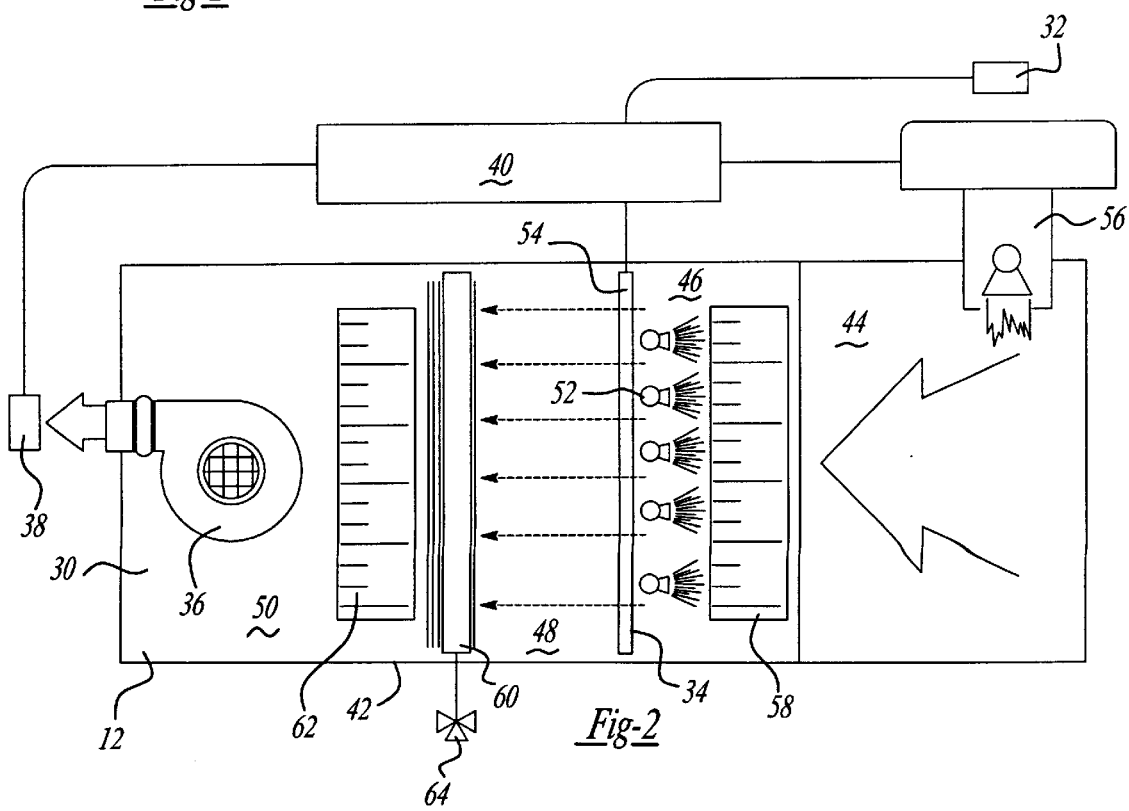

FIG. 5 is a diagrammatic view of the array of humidifying spray nozzles 52 positioned adjacent a plurality of pre-filters 58' as provided according to an optional embodiment of the present invention. While the pre-filters 58 are provided above with respect to FIG. 2 as being panels or, optionally, a continuous mat, the pre-filters 58' of FIG. 5 illustrate an alternate embodiment of blocks which may be utilized as desired. The filter material for the pre-filters 58' would be the same as or similar to that of the pre-filter 58 or the final filter 62 described above with respect to FIG. 2.

Figure 6:
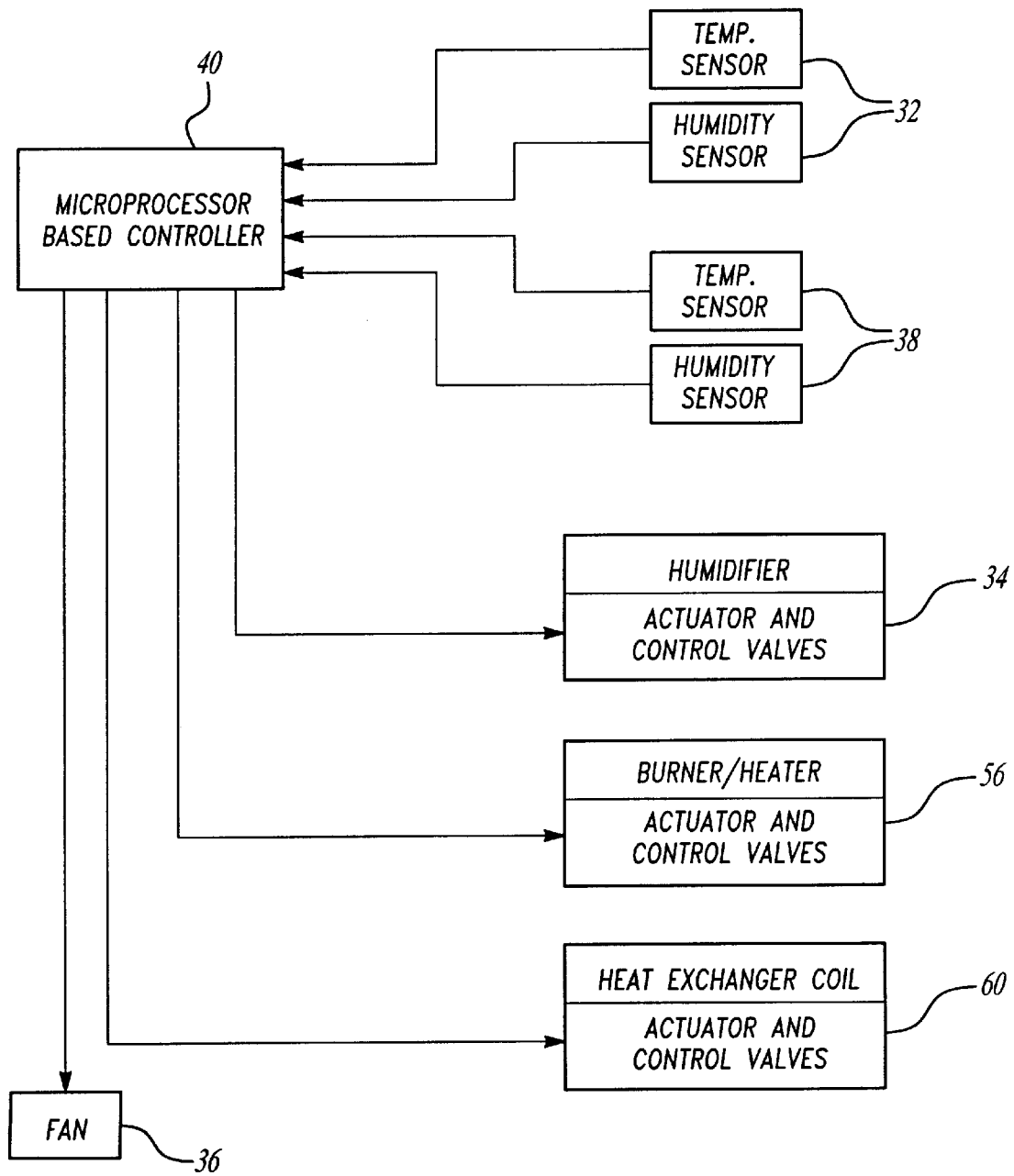

FIG. 6 illustrates s a schematic of the system 12 of the present invention. Referring to that figure, the temperature and humidity sensors 32 respond to ambient air temperature and humidity. If the ambient air or outputted air temperatures are too low, a signal is sent by the temperature sensor 32 or by the temperature sensor 38 as the case may be to the controller 40 to engage the burner-heater 56 (where provided) or the heat exchanger 60 (again where provided) to compensate for the difference in temperature. If the ambient or outputted air humidity is too low, a signal is sent by the humidity sensor 32 or the humidity sensor 38 as the case may be to the controller 40 to engage the humidifier 34 by opening and controlling requisite actuator and control valves (not shown) to adjust the amount of water or water and air flowing from the nozzles 52. Air flow rate produced by the fan 36 is also directed by the controller 60 in the event that one or more pressure sensors 70 strategically distributed in the system 12 (e.g., downstream of the nozzles 52, the heat exchanger 60, the final filter 62, or the fan 36) detect an inadequate or an excessive flow rate due to pressure drops or other circumstances. The controller 40 includes microprocessor software which compares the exit air stream relative humidity and temperature levels to the predetermined relative humidity and temperature setpoints, analyzes the difference, and transmits signals to specific system control elements to achieve and maintain the predetermined setpoints.

In operation, the system 12 according to the present invention provides an efficient and space saving air conditioning system which saves the user expense due to its minimum number of parts while assuring that a targeted and pinpointed wet-bulb temperature can be reached and maintained through the ability to fine tune both temperature and humidity. The system 12 thus provides a considerable improvement over known technologies which are able only to meet a desired range of temperature and humidity as defined by a box on the psychrometric chart, the box being generally established in the prior art by a wide humidity range of about between 50% and about 80% and a wide temperature range of between about 65 and about 80° F. This accurate establishment and maintenance of such precise humidity and temperature levels is accomplished by the combination of finely controllable humidification and air speed mechanisms which proportionately adds the precise amount of water vapor necessary to achieve and maintain setpoint. The system 12 substantially eliminates stratification problems by providing a constant near-100% mixing of vapor and airstream, thus providing a substantial adiabatic cooling gain. This is due in part to the arrangement of the nozzles 52 wherein the evaporation of the atomized spray increases the airstream humidity level and simultaneously adiabatically cools the air by converting the sensible heat to latent heat. All of this is accomplished without static pressure variations.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A system for conditioning air, the system including:
  a main air conditioning body, said body having an entry end for allowing the entry of air therein and an exhaust end for allowing the exhaust of air therefrom, said entering air and said exhausting air defining a passing air current therebetween;
  an ambient air temperature and humidity sensor fitted adjacent said entry end;
  a humidifier fitted with a plurality of nozzles, said nozzles being mounted in opposition to the direction of said passing air current, whereby air is introduced into the passing air current for humidification thereof;
  a conditioned air fan for driving said air current through said main air conditioning body;
  a conditioned air temperature and humidity sensor fitted downstream of said conditioned air fan;
  one or more pressure sensors;
  a central controller for sensing and responding to said sensors and for controlling said humidifier and said fan; and
  a plurality of electrical conduits for connecting said central controller to each of said sensors, said humidifier, and said fan.

2. The system for conditioning air of claim 1, further including a burner-heater fitted upstream of said humidifier.

3. The system for conditioning air of claim 2, further including an electrical conduit fitted between said central controller and said burner-heater.

4. The system for conditioning air of claim 1, further including a pre-filter fitted upstream of said humidifier.

5. The system for conditioning air of claim 4, wherein said pre-filter is an air-filtering screen and provides a surface against which at least part of the water from the nozzles of said humidifier is allowed to strike.

6. The system for conditioning air of claim 1, further including a heat exchanger fitted between said humidifier and said conditioned air fan.

7. The system for conditioning air of claim 6, wherein said heat exchanger includes a three-way valve for simultaneously introducing water of a first temperature and water of a second temperature into said heat exchanger, said first and second temperatures being different.

8. The system for conditioning air of claim 6, wherein said heat exchanger includes a plurality of individual coils, at least some of said coils being fitted with air cooling fins.

9. The system for conditioning air of claim 1, further including a final filter fitted downstream of said humidifier and upstream of said fan.

10. The system for conditioning air of claim 1, wherein said central controller is a microprocessor-based unit.

11. A system for conditioning air, the system including:
  a main air conditioning body which includes an entry end for allowing the entry of air therein and an exhaust end for allowing the exhaust of air therefrom, said entering air and said exhausting air defining a passing air current therebetween;
  an ambient air temperature and humidity sensor fitted adjacent said entry end;
  a burner-heater fitted substantially at said entry end;
  a humidifier for spraying water substantially directly into said passing air current;

a heat exchanger fitted downstream of said humidifier;

a fan for driving said air current through said main air conditioning body;

one or more pressure sensors;

a conditioned air temperature and humidity sensor fitted downstream of said fan; and a controller for operatively connecting said sensors, said burner-heater and said humidifier, and said fan.

12. The system for conditioning air of claim 11, further including a pre-filter fitted between said burner-heater and said humidifier.

13. The system for conditioning air of claim 12, wherein said pre-filter is an air-filtering screen and provides a surface against which at least part of the water from the humidifier is allowed to strike.

14. The system for conditioning air of claim 11, wherein said heat exchanger includes a three-way valve for introducing water of a first temperature and water of a second temperature into said heat exchanger, said first and second temperatures being different.

15. The system for conditioning air of claim 11, wherein said heat exchanger includes a plurality of coils, at least some of said coils being fitted with cooling fins.

16. The system for conditioning air of claim 11, further including a final filter fitted between said heat exchanger and said fan.

17. The system for conditioning air of claim 11, wherein said means for operatively connecting is an electronic central controller.

18. The system for conditioning air of claim 17, further including a plurality of electrical conduits for connecting said central controller to each of said sensors, said burner-heater, said humidifier, and said fan.

19. The system for conditioning air of claim 17, wherein said central controller is a microprocessor-based unit.

20. A method for conditioning air, the method comprising the steps of:

forming an air conditioning system which includes a main air conditioning body, a first ambient air temperature and humidity sensor, a humidifier for spraying water into a passing stream of air, said humidifier being fitted downstream of said first sensor, a fan fitted downstream of said humidifier, a second air temperature and humidifier sensor fitted downstream of said fan, one or more pressure sensor, and a central controller in electrical communication with said first sensor, said humidifier, and said second sensor;

causing said fan to drawn air through said main air conditioning body; and having said central controller respond to temperature and humidity levels indicated by said first sensor and/or said second sensor by controlling the water output level of said humidifier.

* * * * *